US011999371B2

(12) United States Patent
Lei

(10) Patent No.: US 11,999,371 B2
(45) Date of Patent: Jun. 4, 2024

(54) DRIVING ASSISTANCE PROCESSING METHOD AND APPARATUS, COMPUTER-READABLE MEDIUM, AND ELECTRONIC DEVICE

(71) Applicant: Tencent Technology (Shenzhen) Company Limited, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 16 days.

(21) Appl. No.: 17/991,774

(22) Filed: Nov. 21, 2022

(65) Prior Publication Data

US 2023/0090975 A1 Mar. 23, 2023

Related U.S. Application Data

(63) Continuation of application No. PCT/CN2021/138158, filed on Dec. 15, 2021.

(30) Foreign Application Priority Data

May 17, 2021 (CN) .......................... 202110536723.3

(51) Int. Cl.
*B60Q 1/00* (2006.01)
*B60W 40/06* (2012.01)
(Continued)

(52) U.S. Cl.
CPC ............ *B60W 50/14* (2013.01); *B60W 40/06* (2013.01); *H04W 4/025* (2013.01);
(Continued)

(58) Field of Classification Search
CPC ................ B60W 50/14; B60W 40/06; B60W 2050/146; B60W 2554/00;
(Continued)

(56) References Cited

U.S. PATENT DOCUMENTS

2012/0218124 A1* 8/2012 Lee .................. B60W 30/18163
340/904
2017/0236413 A1* 8/2017 Takagi ............ B60W 30/18154
701/117
(Continued)

FOREIGN PATENT DOCUMENTS

CN 105774809 A 7/2016
CN 110379157 A 10/2019
(Continued)

OTHER PUBLICATIONS

Tencet Technology, Extended European Search Report and Supplementary Search Report, EP Patent Application No. 21940577.6, dated Jan. 9, 2024, 7 pgs.
(Continued)

*Primary Examiner* — Anh V La
(74) *Attorney, Agent, or Firm* — Morgan, Lewis & Bockius LLP

(57) ABSTRACT

An electronic device obtains location information and traveling status information of a vehicle terminal and road condition information of a road section on which the vehicle terminal travels. The electronic device obtains blind spot detection capability information of the vehicle terminal. The electronic device determines a potential blind spot of the vehicle terminal in a traveling process according to the location information and the traveling status information of the vehicle terminal and the road condition information to obtain a blind spot detection result. The electronic device generates a blind spot supplementary reminder message according to the blind spot detection result and the blind spot detection capability information of the vehicle terminal, and sends the blind spot supplementary reminder message to the vehicle terminal.

20 Claims, 5 Drawing Sheets

(51) Int. Cl.
*B60W 50/14* (2020.01)
*H04W 4/02* (2018.01)

(52) U.S. Cl.
CPC ... *B60W 2050/146* (2013.01); *B60W 2554/00* (2020.02); *B60W 2556/10* (2020.02)

(58) Field of Classification Search
CPC ........... B60W 2556/10; B60W 40/076; B60W 30/08; B60W 40/02; B60W 50/00; B60W 2050/0005; H04W 4/025; H04W 4/44; G08G 1/096716; G08G 1/096741; G08G 1/096775; G08G 1/167
USPC ................ 340/438, 439, 435, 436, 901, 903
See application file for complete search history.

(56) References Cited

U.S. PATENT DOCUMENTS

| | | | |
|---|---|---|---|
| 2018/0096600 A1 | 4/2018 | Bletzer et al. | |
| 2019/0202476 A1* | 7/2019 | Tao | B60W 30/095 |
| 2019/0389464 A1* | 12/2019 | Nanri | B60W 30/18 |

FOREIGN PATENT DOCUMENTS

| | | |
|---|---|---|
| CN | 110853407 A | 2/2020 |
| CN | 111062318 A | 4/2020 |
| CN | 111391863 A | 7/2020 |
| CN | 112216097 A | 1/2021 |
| CN | 113119962 A | 7/2021 |

OTHER PUBLICATIONS

Tencent Technology, WO, PCT/CN2021/138158, Mar. 9, 2022, 4 pgs.
Tencent Technology, IPRP, PCT/CN2021/138158, Nov. 21, 2023, 5 pgs.
Tencent Technology, ISR, PCT/CN2021/138158, Mar. 9, 2022, 3 pgs.

* cited by examiner

DRIVING ASSISTANCE PROCESSING METHOD AND APPARATUS, COMPUTER-READABLE MEDIUM, AND ELECTRONIC DEVICE

CROSS-REFERENCE TO RELATED APPLICATIONS

This application is a continuation application of PCT Patent Application No. PCT/CN2021/138158, entitled "DRIVER ASSISTANCE PROCESSING METHODS, DEVICES, COMPUTER-READABLE MEDIA AND ELECTRONIC EQUIPMENT" filed on Dec. 15, 2021, which claims priority to Chinese Patent Application No. 202110536723.3, filed with the State Intellectual Property Office of the People's Republic of China on May 17, 2021, and entitled "DRIVING ASSISTANCE PROCESSING METHOD AND APPARATUS, COMPUTER-READABLE MEDIUM, AND ELECTRONIC DEVICE", all of which are incorporated herein by reference in their entirety.

FIELD OF THE TECHNOLOGY

This application relates to the field of computer and communication technologies, and specifically, to a driving assistance processing method and apparatus, a computer-readable medium, and an electronic device.

BACKGROUND OF THE DISCLOSURE

An advanced driving assistance system (ADAS) senses a surrounding environment in real time by using various sensors (millimeter-wave radar, LIDAR, monocular or binocular camera and satellite navigation, and the like) installed on a vehicle in a traveling process of the vehicle, collects data, identifies, detects, and tracks stationary and moving objects, and performs system operation and analysis in combination with navigation map data, to enable a driver to recognize potential hazards in advance, thereby effectively increasing the comfort and safety of car driving.

However, a conventional ADAS has the problem of a limited sensing range, and a more effective collaboration mechanism between multiple vehicles is lacking when a driving safety risk arises. Therefore, there are limitations in terms of safety.

SUMMARY

Embodiments of this application provide a driving assistance processing method and apparatus, a computer-readable medium, and an electronic device, to reduce a probability of missed detection and missed warning of a blind spot at least to some extent, thereby effectively enhancing the safety of an ADAS.

Other characteristics and advantages of this application become apparent from the following detailed description, or may be learned in part through the practice of this application.

According to an aspect of the embodiments of this application, a driving assistance processing method is provided, performed by an electronic device, and including: obtaining location information and traveling status information of a vehicle terminal and road condition information of a road section on which the vehicle terminal travels, and obtaining blind spot detection capability information of the vehicle terminal; determining a potential blind spot of the vehicle terminal in a traveling process according to the location information and the traveling status information of the vehicle terminal and the road condition information to obtain a blind spot detection result; generating a blind spot supplementary reminder message according to the blind spot detection result and the blind spot detection capability information of the vehicle terminal; and sending the blind spot supplementary reminder message to the vehicle terminal.

According to an aspect of the embodiments of this application, a driving assistance processing apparatus is provided, including: an obtaining unit, configured to: obtain location information and traveling status information of a vehicle terminal and road condition information of a road section on which the vehicle terminal travels, and obtain blind spot detection capability information of the vehicle terminal; a processing unit, configured to determine a potential blind spot of the vehicle terminal in a traveling process according to the location information and the traveling status information of the vehicle terminal and the road condition information to obtain a blind spot detection result; a generation unit, configured to generate a blind spot supplementary reminder message according to the blind spot detection result and the blind spot detection capability information of the vehicle terminal; and a sending unit, configured to send the blind spot supplementary reminder message to the vehicle terminal.

According to an aspect of the embodiments of this application, a non-transitory computer-readable storage medium is provided, storing a computer program, the computer program, when executed by a processor, implements the driving assistance processing method according to the foregoing embodiment.

According to an aspect of the embodiments of this application, an electronic device is provided, including: one or more processors; and a storage apparatus, configured to store one or more programs, the one or more programs, when executed by the one or more processors, causing the one or more processors to implement the driving assistance processing method according to the foregoing embodiment.

According to an aspect of the embodiments of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the driving assistance processing method provided in the foregoing embodiments.

It is to be understood that the above general descriptions and the following detailed descriptions are merely for exemplary and explanatory purposes, and cannot limit this application.

BRIEF DESCRIPTION OF THE DRAWINGS

The accompanying drawings herein, which are incorporated into the specification and constitute a part of this specification, show embodiments that conform to this application, and are used for describing a principle of this application together with this specification. Apparently, the accompanying drawings in the following description show merely some embodiments of this application, and a person of ordinary skill in the art may still derive other drawings from these accompanying drawings without creative efforts. In the accompanying drawings.

DESCRIPTION OF EMBODIMENTS

Now, exemplary implementations are described comprehensively with reference to the accompanying drawings. However, the exemplary implementations may be implemented in various forms, and are not to be understood as being limited to the examples described herein. Instead, the implementations are provided to make this application more thorough and complete and fully convey the idea of the exemplary implementations to a person skilled in the art.

In addition, the described features, structures, or characteristics may be combined in one or more embodiments in any appropriate manner. In the following descriptions, a lot of specific details are provided to give a full understanding of the embodiments of this application. However, a person skilled in the art is to be aware of that, the technical solutions in this application may be implemented without one or more of the particular details, or other methods, unit, apparatus, or step may be adopted. In other cases, well-known methods, apparatuses, implementations, or operations are not shown or described in detail, to avoid obscuring the aspects of this application.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

"Plurality of" mentioned in the specification means two or more. The term "and/or" describes an association relationship for describing associated objects and represents that three relationships may exist. For example, A and/or B may represent the following three cases: Only A exists, both A and B exist, and only B exists. The character "I" generally indicates an "or" relationship between the associated objects.

Figure 1:
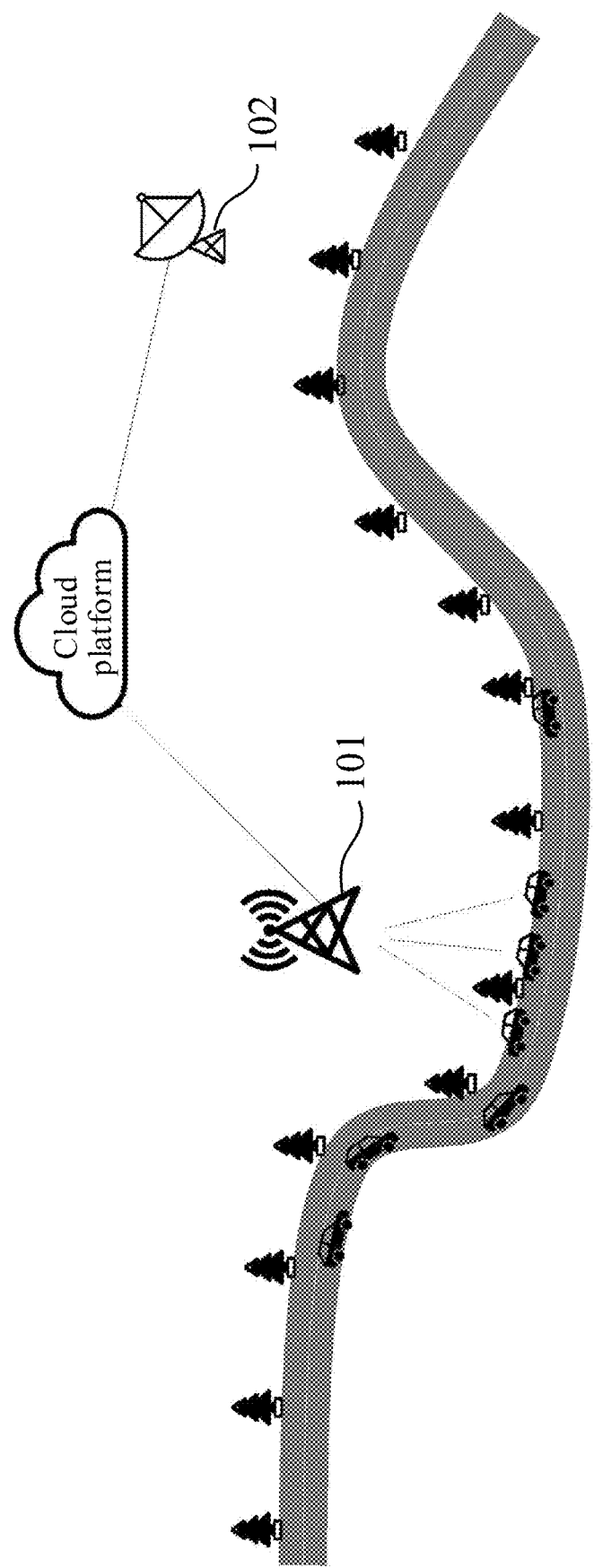
FIG. 1 is a schematic diagram of an application scenario according to an embodiment of this application.

FIG. 1 is a schematic diagram of an application scenario according to an embodiment of this application.

As shown in FIG. 1, in an application scenario of this application, a vehicle terminal may communicate with a cloud platform through a base station 101. According to some embodiments of the present disclosure, the vehicle terminal is a terminal that is installed on (or is a part of) a vehicle. The cloud platform may intercommunicate with a high-precision positioning system 102 and implement high-precision positioning of the vehicle terminal by collaborating with the vehicle terminal. The base station 101 may be a 5G base station or may be a 3G or 4G base station or may be a next-generation mobile communication base station. The cloud platform may be a road-side cloud platform or a central cloud platform. The road-side cloud platform is a cloud platform disposed near a road and is only configured to serve a few road sections. With respect to the road-side cloud platform, the central cloud platform is a cloud platform that serves many road sections or all road sections. The service area of the central cloud platform is much larger than that of the road-side cloud platform. The central cloud platform may be disposed at a back end of a core network.

In some embodiments, the vehicle terminal may interact with the cloud platform (including the central cloud platform and the road-side cloud platform) through the base station 101 (that is, a mobile communication network) as shown in FIG. 1, and may further interact with the road-side cloud platform through vehicle-to-everything (V2X) communication.

In an embodiment of this application, the vehicle terminal shown in FIG. 1 may be provided with an ADAS function. The ADAS function specifically includes a warning system and a control system. The warning system includes a forward collision warning (FCW) system, a lane departure warning (LDW) system, a blind spot detection (BSD) system, a driver fatigue warning (DFW) system, a tire pressure monitoring system (TPMS), and the like. The control system includes a lane keeping assist (LKA) system, an automated parking system (APS), an autonomous emergency braking (AEB) system, an adaptive cruise control (ACC) system, a pedestrian protection system (PPS), a down-hill assist control (DAC) system, and the like. Certainly, in the embodiments of this application, not all vehicles have the ADAS function. A vehicle with the ADAS function does not necessarily have all the foregoing functions, and may have only part of the ADAS function.

In an embodiment of this application, the vehicle terminal may report the location information and the traveling status information of the vehicle terminal and the road condition information of the road section on which the vehicle terminal travels to a cloud platform (for example, the cloud platform shown in FIG. 1), and may upload blind spot detection capability information of the vehicle terminal to the cloud platform. The cloud platform may determine a potential blind spot of the vehicle terminal in a traveling process according to the location information and the traveling status information of the vehicle terminal and the road condition information to obtain a blind spot detection result. The cloud platform may generate a blind spot supplementary reminder message according to the blind spot detection result and the blind spot detection capability information of the vehicle terminal, and then send the blind spot supplementary reminder message to the vehicle terminal. As can be seen, in the technical solution in the embodiments of this application, a cloud platform can assist a vehicle in blind spot detection to reduce a probability of missed detection and missed warning of a blind spot, to resolve the problem of a limited sensing range of a conventional single-vehicle ADAS, thereby effectively enhancing the safety of the ADAS.

In an embodiment of this application, the cloud platform may determine a potential blind spot of a vehicle in a traveling process depending on an artificial intelligence (AI)

technology. The AI technology is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that can react in a manner similar to human intelligence. AI is to study the design principles and implementation methods of various intelligent machines, so that the machines can perceive, infer, and make decisions.

In addition, the AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes fields such as a CV technology, a speech processing technology, a natural language processing technology, and machine learning/deep learning (DL).

Computer vision (CV) is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

In combination with this application, both the vehicle terminals and the cloud platform can use technologies such as CV and machine learning in the AI technology to improve the accuracy of driving assistance. The vehicle terminals can also implement autonomous driving based on this.

The implementation details of the technical solutions in the embodiments of this application are described below in detail.

Figure 2:
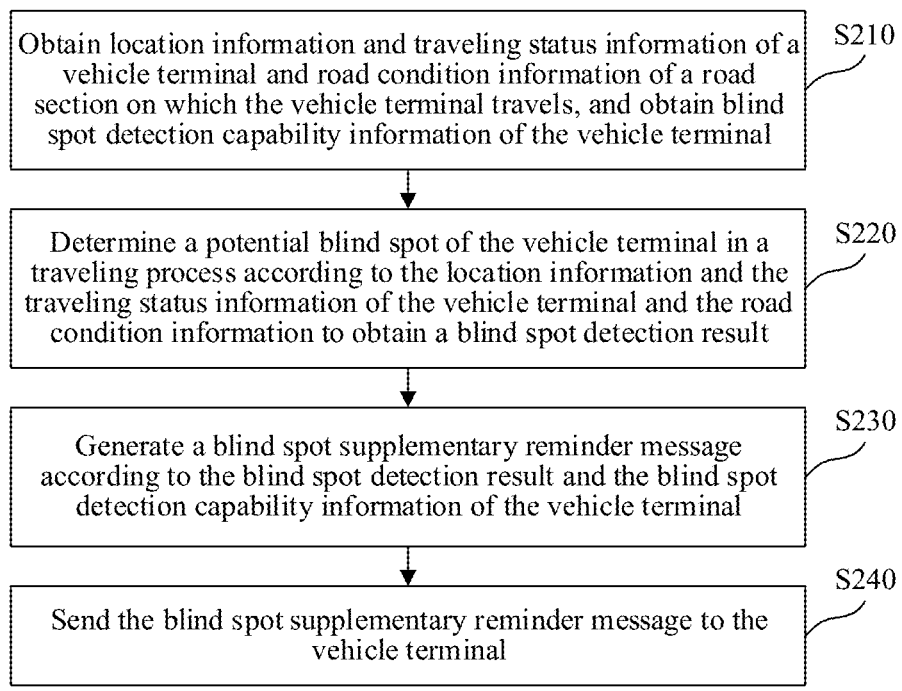
FIG. 2 is a flowchart of a driving assistance processing method according to an embodiment of this application.

FIG. 2 is a flowchart of a driving assistance processing method according to an embodiment of this application. The driving assistance processing method may be performed by a cloud platform, where the cloud platform may be a central cloud platform or a road-side cloud platform, or performed by the driving assistance processing apparatus shown in FIG. 5, or performed by the electronic device shown in FIG. 6. Referring to FIG. 2, the driving assistance processing method includes steps S210 to S230, which are described below in detail:

Step S210: Obtain location information and traveling status information of a vehicle terminal and road condition information of a road section on which the vehicle terminal travels, and obtain blind spot detection capability information of the vehicle terminal.

In an embodiment of this application, when the cloud platform is a central cloud platform, the vehicle terminals may send the location information, the traveling status information, and the road condition information of the road section on which the vehicle terminals travel to the central cloud platform through a mobile communication network. When the cloud platform is a road-side cloud platform, the vehicle terminals may send the location information, the traveling status information, and the road condition information of the road section on which the vehicle terminals travel to the road-side cloud platform through a mobile communication network or V2X communication.

The location information of the vehicle terminals may be sent to the cloud platform by the vehicle terminals or may be obtained by the cloud platform by intercommunicating with a high-precision positioning system and implementing high-precision positioning of the vehicle terminals by collaborating with the vehicle terminals. The traveling status information of the vehicle terminals includes speed information, acceleration information, and the like of the vehicle terminals. The road condition information of the road section on which the vehicle terminals travel includes a potential safety risk (for example, whether there is a landslide, whether there is a slippery road surface, whether there is a side wind, and whether there is a tunnel) on the road section on which the vehicle terminals travel or may include a vehicle condition (for example, whether there is a potential safety risk of another vehicle) on the road section.

In an embodiment of this application, a process of obtaining blind spot detection capability information of the vehicle terminal by the cloud platform may be obtaining advanced driving assistance ADAS capability information sent by the vehicle terminal, the ADAS capability information including identifier information of the vehicle terminal and at least one piece of the following information of the vehicle terminal: information about support for a plurality of ADAS functions of the vehicle terminal and information about a sensor equipped on the vehicle terminal. The blind spot detection capability information of the vehicle terminal may be determined according to the ADAS capability information.

Figure 3:
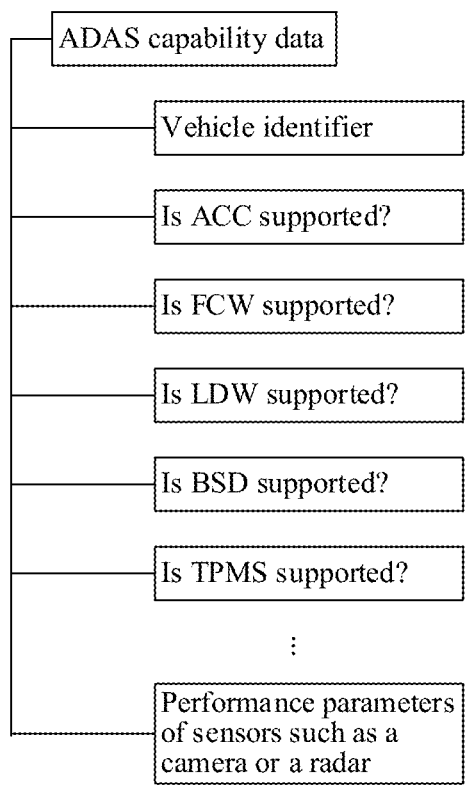
FIG. 3 is a schematic diagram of ADAS capability information according to an embodiment of this application.

The format of the ADAS capability information sent by the vehicle terminal may be shown in FIG. 3. The ADAS capability information includes identifier information of each vehicle terminal and at least one of the following information: information about support for a plurality of ADAS functions of the vehicle terminal (for example, whether ACC is supported, whether FCW is supported, whether LDW is supported, whether BSD is supported, and whether a TPMS is supported); and information about a sensor equipped on the vehicle terminal (performance parameters of sensors such as a camera or a radar).

In an embodiment of this application, a process of obtaining blind spot detection capability information of the vehicle terminal by the cloud platform may be obtaining a blind spot detection history record reported by the vehicle terminal, and then determining the blind spot detection capability information of the vehicle terminal according to the blind spot detection history record. For example, the vehicle terminal detects and records blind spot information by using sensors that are included in the vehicle in a traveling process (e.g., while the vehicle is traveling). The cloud platform may analyze the blind spot detection history record of the vehicle terminal to determine the blind spot detection capability information of the vehicle terminal, for example, whether the vehicle terminal has a blind spot detection capability, the intensity of the blind spot detection capability of the vehicle terminal, and the like.

In an embodiment of this application, a process of obtaining blind spot detection capability information of the vehicle terminal by the cloud platform may be obtaining a blind spot detection history record reported by the vehicle terminal and feedback information of a driver of the vehicle terminal to blind spot warning, and then determining the blind spot detection capability information of the vehicle terminal according to the blind spot detection history record and the feedback information of the driver of the vehicle terminal to the blind spot warning. For example, the vehicle terminal detects a blind spot in a traveling process and performs blind spot warning. If the driver chooses to ignore the blind spot warning, it indicates that the blind spot warning of the vehicle terminal may be incorrect warning. If the driver accepts the blind spot warning or feeds back that the blind spot warning is accurate, it indicates that the blind spot warning of the vehicle terminal is correct. In this case, the cloud platform may analyze the intensity information and the like of the blind spot detection capability of the vehicle terminal.

Step S220: Determine a potential blind spot of the vehicle terminal in a traveling process according to the location information and the traveling status information of the vehicle terminal and the road condition information to obtain a blind spot detection result.

In an embodiment of this application, a process of determining a potential blind spot of the vehicle terminal in a traveling process by the cloud platform may be: in response to determining, according to the location information and the traveling status information of the vehicle terminal and the road condition information, that a visual obstacle exists at a location of the vehicle terminal, generate the potential blind spot of the vehicle terminal based on the location at which the visual obstacle exists. In response to determining, according to the location information and the traveling status information of the vehicle terminal and the road condition information, that the vehicle terminal meets at least one of the following conditions, determine that the visual obstacle exists at the location of the vehicle terminal. For example, a visual obstacle exists at the location of the vehicle terminal when the location of the vehicle terminal corresponds to a bend area (for example, if the angle of the bend is large, visual hindrance appears), or the vehicle terminal is in a tunnel, or the vehicle terminal is in an uphill state (for example, visual hindrance appears when the slope is steep), and/or an obstacle blockage exists at a nearby location of the vehicle terminal.

Step S230: Generate a blind spot supplementary reminder message according to the blind spot detection result and the blind spot detection capability information of the vehicle terminal.

In an embodiment of this application, before the blind spot supplementary reminder message is generated, it may be determined, according to the blind spot detection result and the blind spot detection capability information of the vehicle terminal, whether it is necessary to send the blind spot supplementary reminder message to the vehicle terminal. The blind spot supplementary reminder message is generated in response to determining, according to the blind spot detection result and the blind spot detection capability information of the vehicle terminal, that it is necessary to send the blind spot supplementary reminder message to the vehicle terminal.

Step S240: Send the blind spot supplementary reminder message to the vehicle terminal.

In an embodiment of this application, to ensure that the vehicle terminal can process the blind spot supplementary reminder message in time, the cloud platform may synchronize time with the vehicle terminal to allow the vehicle terminal to process the blind spot supplementary reminder message based on the synchronized time.

In an embodiment of this application, the cloud platform may add explicit timestamp information to the blind spot supplementary reminder message to synchronize the time with the vehicle terminal.

In an embodiment of this application, the cloud platform may synchronize the time with the vehicle terminal in an implicit indication mode, the implicit indication mode including implicitly indicating, based on explicit timestamp information of some data packets in data packets transmitted through the same transmission channel, timestamp information of other data packets. For example, the cloud platform transmits a plurality of data packets through a transmission channel. In this case, explicit timestamp information may be added to some data packets, to implicitly indicate time information of other data packets that carry no timestamp information.

In an embodiment of this application, when it is difficult to determine a potential blind spot of the vehicle terminal in the traveling process according to the location information and the traveling status information of the vehicle terminal and the road condition information, the cloud platform may send a blind spot reminder message to all vehicle terminals on the road section on which the vehicle terminal travels, to remind vehicle terminals on the road section about traveling safety.

In an embodiment of this application, in response to predicting, according to the location information and the traveling status information of the vehicle terminal and the road condition information of the road section on which the vehicle terminal travels, that a network status of an area that the vehicle terminal is about to enter is inadequate to support blind spot warning, the cloud platform may send warning information to the vehicle terminal before the vehicle terminal enters the area. The warning information sent by the cloud platform to the vehicle terminal before the vehicle terminal enters the area includes at least one of the following: information about a potential blind spot in the area that the vehicle is about to enter, and information prompting that blind spot warning cannot be provided in the area that the vehicle is about to enter.

In an embodiment of this application, when the area that the vehicle is about to enter is not within a network coverage area or network quality in the area that the vehicle is about to enter is less than a set value, determine that the network status of the area is inadequate to support blind spot warning. The network quality may be a network signal value, a network transmission rate value, or the like.

In summary, in the embodiments of this application, mainly a cloud platform (a central cloud platform or a road-side cloud platform) obtains location information and traveling status information of a vehicle, road condition information, and the like, and analyzes location information, speed information, and the like of vehicles near the vehicle to determine a potential blind spot of the vehicle, to determine, according to blind spot detection capability information of the vehicle, whether it is necessary to send a blind spot supplementary reminder message to the vehicle. Detailed description is provided below with reference to FIG. 4.

Figure 4:
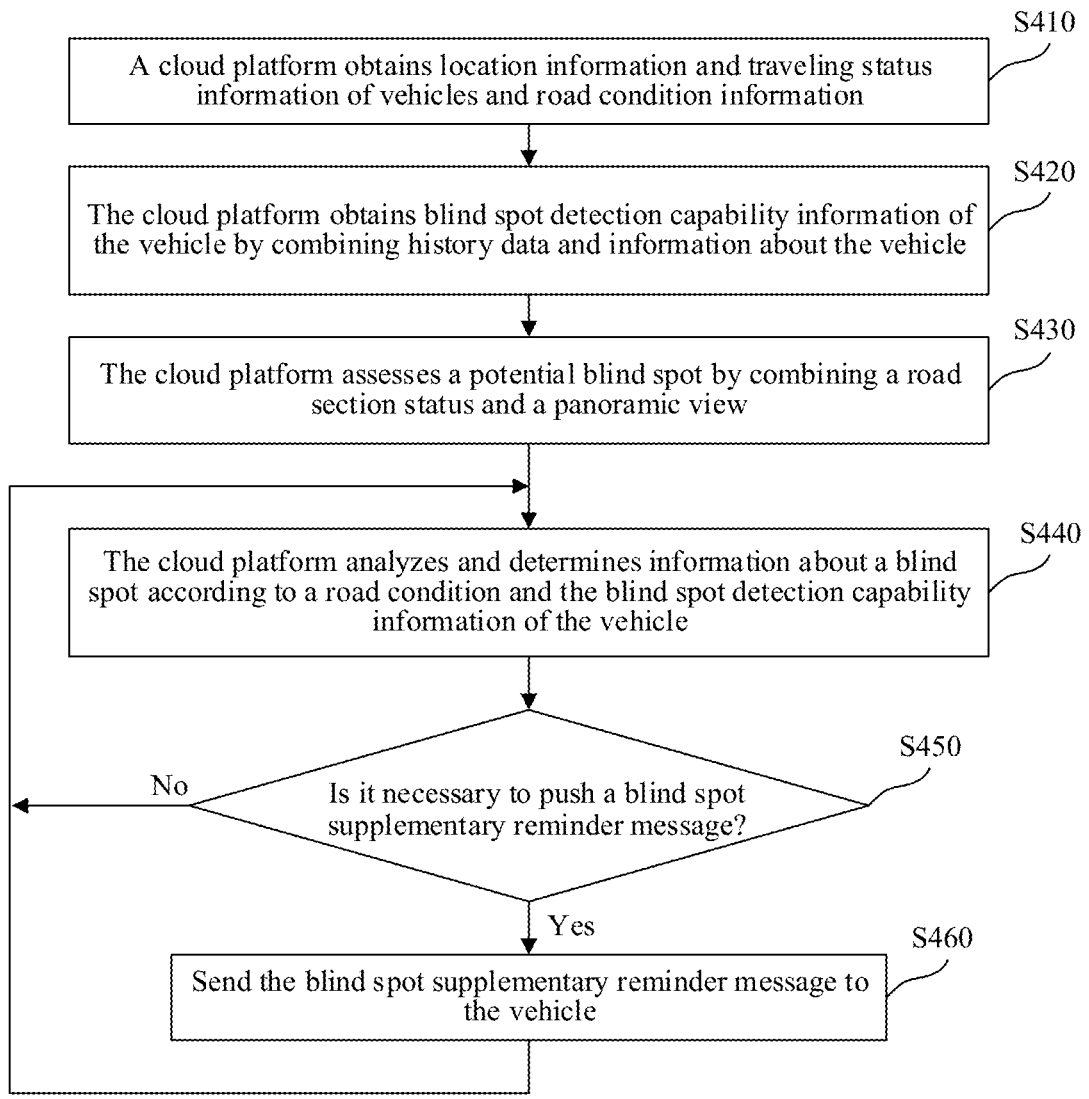
FIG. 4 is a flowchart of a driving assistance processing method according to an embodiment of this application.

FIG. 4 is a flowchart of a driving assistance processing method according to an embodiment of this application. The method may be performed by the electronic device shown in FIG. 6. Referring to FIG. 4, the driving assistance processing method includes steps S410 to S460, which are described below in detail:

Step S410: A cloud platform obtains location information and traveling status information of vehicles and road condition information.

In an embodiment of this application, the cloud platform may be a central cloud platform or a road-side cloud platform. The central cloud platform provides large-area coverage through a mobile communication network (for example, a 5G network). The road-side cloud platform provides small-area coverage through a 5G small base station or a road-side unit (RSU) of V2X.

In an embodiment of this application, the road condition information may be a potential safety risk (for example, a landslide, a slippery road surface, a side wind, and a tunnel) on the road section on which the vehicle travels or may be a vehicle condition on a specific road section, for example, blind spots caused by a sharp turn, a tunnel, a slope, and another visual obstacle. The occurrence of these blind spots is also related to the location of the vehicle.

In an embodiment of this application, the location information and the traveling status information of the vehicle are vital for blind spot detection. To improve the accuracy and pertinence of blind spot detection and reduce unnecessary false alarm, the location information and the traveling status information of the vehicle need to be transferred to the cloud platform in real time through a 5G network or a V2X network. In addition, due to a communication transmission delay and a processing delay, time synchronization is required between the vehicle and the cloud platform, and an ADAS module of the vehicle terminal needs to support a compensation function. That is, a reminder of the cloud platform can be processed according to explicit timestamp information in a reminder message or implicit delay estimation.

Step S420: The cloud platform obtains blind spot detection capability information of the vehicle by combining history data and information about the vehicle.

In an embodiment of this application, the configuration of the vehicle may support or may not support blind spot detection, and specific capabilities of supporting blind spot detection of vehicles are different. Therefore, a vehicle terminal may transmit history data of blind spot detection to a cloud and is configured to assist the cloud to provide a personalized blind spot detection service to the vehicle. In this embodiment, the cloud platform also needs to learn information such as the identifier of the vehicle, ADAS related capabilities of the vehicle, the functions and performance indicators of the sensors of the vehicle, and communication capabilities. The communication capabilities of the vehicle include a Uu networking capability, a PC5 networking capability, and the like.

In an embodiment of this application, each vehicle has blind spot detection behavior and a traveling record in a traveling process. The cloud platform may analyze the determination of a potential blind spot of the vehicle and the driver of the vehicle according to the information. The information includes safety warning information that already occurs and also includes traffic danger information and the like that may occur due to an error in blind spot detection. For example, for a case in which different road conditions such as a sharp turn, a tunnel, a slope, and another visual obstacle may cause blind spots, even if the vehicle is not involved in an accident, driving data of the vehicle can still be used for assessing a blind spot detection capability.

Step S430: The cloud platform assesses a potential blind spot by combining a road section status and a panoramic view.

In an embodiment of this application, the cloud platform may combine the road condition information of the road section on which the vehicle travels and the blind spot detection capability of the vehicle, whether there is a blind spot that cannot be perceived by the vehicle. The road condition information may be a potential safety risk (for example, a landslide, a slippery road surface, a side wind, and a tunnel) on the road section on which the vehicle travels or may be a temporary failure of camera detection of the vehicle caused by line of sight blockage and a sharp turn due to a vehicle condition on a specific road section such as a nearby large vehicle, incomplete view in front and behind the vehicle caused by a slope, and the like.

In an embodiment of this application, the cloud platform may combine a relative location distribution relationship of vehicles to determine whether there is a blind spot. The reason is that for blind spot detection, a sharp turn, a tunnel, a slope, and another visual obstacle may all cause blind spots. The occurrence of these blind spots is also related to the location of the vehicle.

In an embodiment of this application, when the cloud platform cannot accurately analyze and determine direct, mutual blind spot relationships between vehicles according to location relationships between the vehicles, regional warning may be performed to send blind spot information to all vehicles on the road section.

In an embodiment of this application, when the cloud platform may accurately analyze and determine direct, mutual blind spot relationships between vehicles according to location relationships between the vehicles, selective warning may be performed to send blind spot information to vehicles with a specific blind spot.

In an embodiment of this application, for a vehicle with a lower sensing capability (especially a vehicle without a blind spot detection capability), that is, a vehicle that requires network assistance or even manipulation, when a 5G network has limited coverage in a geographical area or poor network quality and as a result the cloud platform cannot continuously provide a blind spot warning function, the cloud platform may inform the vehicle in advance before the vehicle enters the weak-network area.

Step S440: The cloud platform analyzes and determines information about a blind spot according to a road condition and the blind spot detection capability information of the vehicle.

Step S450: The cloud platform determines whether it is necessary to push a blind spot supplementary reminder message.

In an embodiment of this application, the cloud platform may determine, according to a blind spot obtained through the analysis of a panoramic view and in combination with the blind spot detection capability of the vehicle acquired by the cloud platform, whether it is necessary to send a blind spot supplementary reminder message to the ADAS module of the vehicle.

Step S460: The cloud platform sends the blind spot supplementary reminder message to the vehicle.

The cloud platform may notify the blind spot supplementary reminder message to the ADAS module of the vehicle through a 5G network or a V2X network.

In the technical solution in the foregoing embodiments of this application, a cloud platform can assist a vehicle in blind spot detection to reduce a probability of missed detection and missed warning of a blind spot, to resolve the problem of a limited sensing range of a conventional single-vehicle ADAS, thereby effectively enhancing the safety of the ADAS.

The following describes apparatus embodiments of this application, and the apparatus embodiments may be used for performing the driving assistance processing method in the foregoing embodiments of this application. For details not disclosed in the apparatus embodiments of this application, refer to the foregoing embodiments of the driving assistance processing method of this application.

Figure 5:
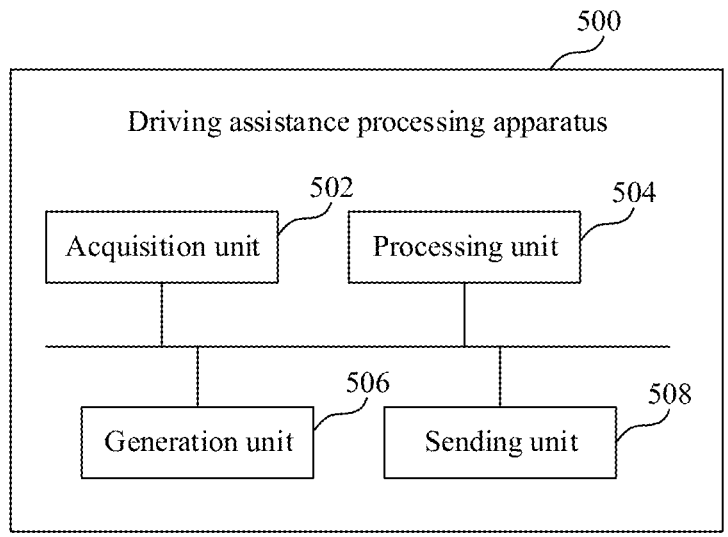
FIG. 5 is a block diagram of a driving assistance processing apparatus according to an embodiment of this application.

FIG. 5 is a block diagram of a driving assistance processing apparatus according to an embodiment of this application.

Referring to FIG. 5, a driving assistance processing apparatus 500 according to an embodiment of this application includes an obtaining unit 502, a processing unit 504, a generation unit 506, and a sending unit 508.

The obtaining unit 502 is configured to obtain location information and traveling status information of a vehicle terminal and road condition information of a road section on which the vehicle terminal travels. The obtaining unit 502 is configured to obtain blind spot detection capability information of the vehicle terminal. The processing unit 504 is configured to determine a potential blind spot of the vehicle terminal in a traveling process according to the location information and the traveling status information of the vehicle terminal and the road condition information to obtain a blind spot detection result. The generation unit 506 is configured to generate a blind spot supplementary reminder message according to the blind spot detection result and the blind spot detection capability information of the vehicle terminal. The sending unit 508 is configured to send the blind spot supplementary reminder message to the vehicle terminal.

In some embodiments of this application, based on the foregoing solution, the processing unit 504 is configured to: in response to determining, according to the location information and the traveling status information of the vehicle terminal and the road condition information, that a visual obstacle exists at a location of the vehicle terminal, generate the potential blind spot of the vehicle terminal based on the location at which the visual obstacle exists.

In some embodiments of this application, based on the foregoing solution, the processing unit 504 is configured to: in response to determining, according to the location information and the traveling status information of the vehicle terminal and the road condition information, that the vehicle terminal meets at least one of the following conditions, determine that the visual obstacle exists at the location of the vehicle terminal. For example, a visual obstacle can exist when the location of the vehicle terminal is a bend area, the vehicle terminal is in a tunnel, the vehicle terminal is in an uphill state, and an obstacle blockage exists at a nearby location of the vehicle terminal.

In some embodiments of this application, based on the foregoing solution, the obtaining unit 502 is configured to: obtain ADAS capability information sent by the vehicle terminal, the ADAS capability information including identifier information of the vehicle terminal and at least one piece of the following information of the vehicle terminal: information about support for a plurality of ADAS functions of the vehicle terminal and information about a sensor equipped on the vehicle terminal; and determine the blind spot detection capability information of the vehicle terminal according to the ADAS capability information.

In some embodiments of this application, based on the foregoing solution, the obtaining unit 502 is configured to: obtain a blind spot detection history record reported by the vehicle terminal; and determine the blind spot detection capability information of the vehicle terminal according to the blind spot detection history record.

In some embodiments of this application, based on the foregoing solution, the obtaining unit 502 is configured to: obtain a blind spot detection history record reported by the vehicle terminal and feedback information of a driver of the vehicle terminal to blind spot warning; and determine the blind spot detection capability information of the vehicle terminal according to the blind spot detection history record and the feedback information of the driver of the vehicle terminal to the blind spot warning.

In some embodiments of this application, based on the foregoing solution, the processing unit 504 is further configured to: synchronize time with the vehicle terminal to allow the vehicle terminal to process the blind spot supplementary reminder message based on the synchronized time.

In some embodiments of this application, based on the foregoing solution, the processing unit 504 is configured to synchronize the time with the vehicle terminal in at least one of the following modes: adding explicit timestamp information to the blind spot supplementary reminder message to synchronize the time with the vehicle terminal; and synchronizing the time with the vehicle terminal in an implicit indication mode, the implicit indication mode including implicitly indicating, based on explicit timestamp information of some data packets in data packets transmitted through the same transmission channel, timestamp information of other data packets.

In some embodiments of this application, based on the foregoing solution, the sending unit 508 is further configured to: when it is difficult to determine a potential blind spot of the vehicle terminal in the traveling process according to the location information and the traveling status information of the vehicle terminal and the road condition information, send a blind spot reminder message to all vehicle terminals on the road section on which the vehicle terminal travels.

In some embodiments of this application, based on the foregoing solution, the sending unit 508 is further configured to: in response to predicting, according to the location information and the traveling status information of the vehicle terminal and the road condition information of the road section on which the vehicle terminal travels, that a network status of an area that the vehicle terminal is about to enter is inadequate to support blind spot warning, send warning information to the vehicle terminal before the vehicle terminal enters the area, where the warning information includes at least one of the following: information about a potential blind spot in the area, and information prompting that blind spot warning cannot be provided in the area.

In some embodiments of this application, based on the foregoing solution, the processing unit 504 is further configured to: when the area is not within a network coverage area or network quality in the area is less than a set value, determine that the network status of the area is inadequate to support blind spot warning.

In some embodiments of this application, based on the foregoing solution, the generation unit 506 is further configured to: determine, according to the blind spot detection result and the blind spot detection capability information of the vehicle terminal, whether it is necessary to send the blind spot supplementary reminder message to the vehicle terminal; and generate the blind spot supplementary reminder message in response to determining, according to the blind spot detection result and the blind spot detection capability information of the vehicle terminal, that it is necessary to send the blind spot supplementary reminder message to the vehicle terminal.

In the technical solution provided in some embodiments of this application, a cloud platform determines a potential blind spot of a vehicle terminal in a traveling process according to location information and traveling status information of the vehicle terminal and road condition information of a road section on which the vehicle terminal travels to obtain a blind spot detection result, then generates a blind spot supplementary reminder message according to the blind spot detection result and blind spot detection capability information of the vehicle terminal, and sends the blind spot supplementary reminder message to the vehicle terminal, so that the cloud platform can assist a vehicle in blind spot detection to reduce a probability of missed detection and missed warning of a blind spot, to resolve the problem of a limited sensing range of a conventional single-vehicle ADAS, thereby effectively enhancing the safety of the ADAS.

Figure 6:
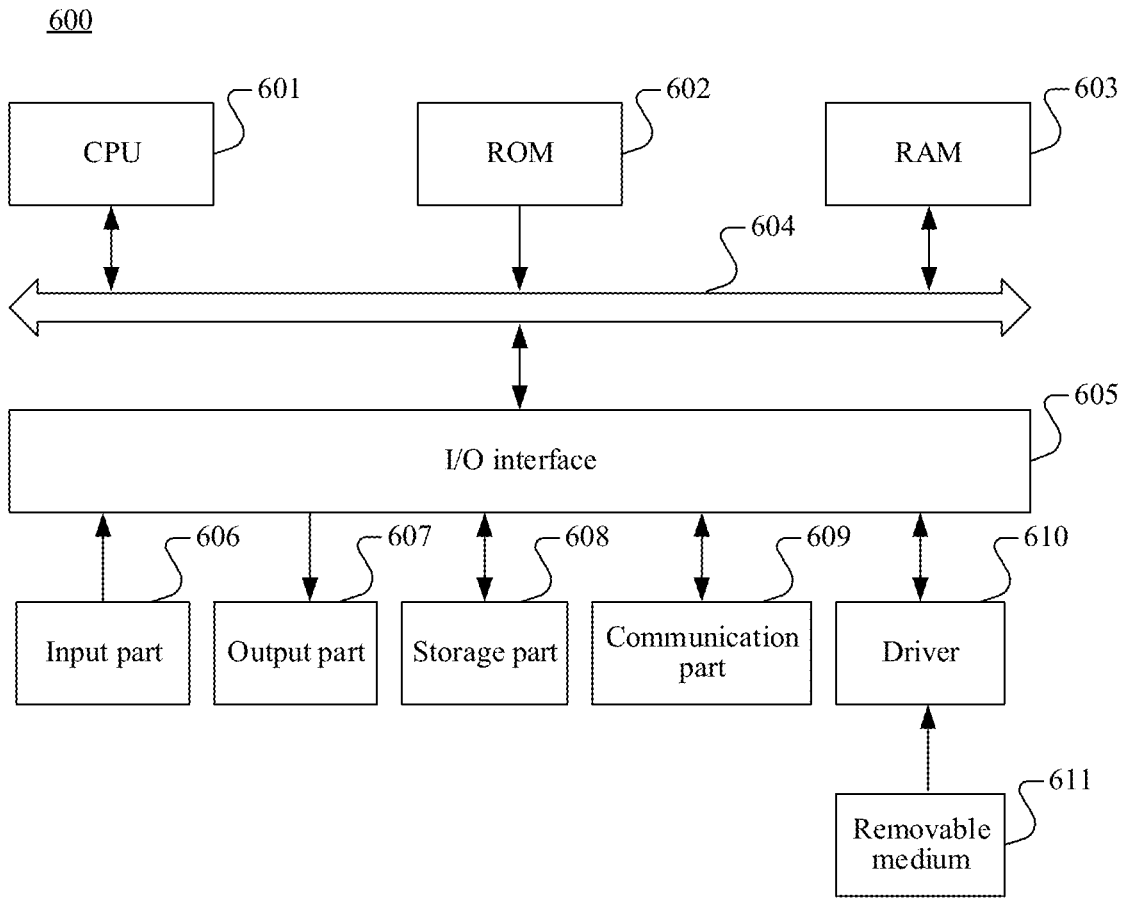
FIG. 6 is a schematic structural diagram of a computer system adapted to implement an electronic device according to an embodiment of this application.

FIG. 6 is a schematic structural diagram of a computer system adapted to implement an electronic device according to an embodiment of this application.

A computer system 600 of the electronic device shown in FIG. 6 is merely an example, and does not constitute any limitation on functions and use ranges of the embodiments of this application.

As shown in FIG. 6, the computer system 600 includes a central processing unit (CPU) 601, which may perform various suitable actions and processing based on a program stored in a read-only memory (ROM) 602 or a program loaded from a storage part 608 into a random access memory (RAM) 603, for example, perform the method described in the foregoing embodiments. The RAM 603 further stores various programs and data required for system operations. The CPU 601, the ROM 602, and the RAM 603 are connected to each other through a bus 604. An input/output (I/O) interface 605 is also connected to the bus 604.

The following components are connected to the I/O interface 605: an input part 606 including a keyboard, a mouse, or the like, an output part 607 including a cathode ray tube (CRT), a liquid crystal display (LCD), a speaker, or the like, a storage part 608 including a hard disk, or the like, and a communication part 609 including a network interface card such as a local area network (LAN) card or a modem. The communication part 609 performs communication processing by using a network such as the Internet. A driver 610 is also connected to the I/O interface 605 as required. A removable medium 611, such as a magnetic disk, an optical disc, a magneto-optical disk, or a semiconductor memory, is mounted on the driver 610 as required, so that a computer program read from the removable medium is installed into the storage part 608 as required.

Particularly, according to an embodiment of this application, the processes described in the foregoing by referring to the flowcharts may be implemented as computer software programs. For example, an embodiment of this application includes a computer program product. The computer program product includes a computer program stored in a computer-readable medium. The computer program includes a computer program used for performing a method shown in the flowchart. In such an embodiment, the computer program may be downloaded and installed from a network through the communication part 609, and/or installed from the removable medium 611. When the computer program is executed by the CPU 601, the various functions defined in the system of this application are executed.

The computer-readable medium shown in the embodiments of this application may be a computer-readable signal medium or a non-transitory computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In this application, the computer-readable storage medium may be any tangible medium including or storing a program, and the program may be used by or in combination with an instruction execution system, apparatus, or device. In this application, the computer-readable signal medium may include a data signal transmitted in a baseband or as part of a carrier, and stores a computer-readable computer program. The propagated data signal may be in a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of this application may be implemented in a software manner, or may be implemented in a hardware manner, and the unit described can also be set in a processor. Names of these units do not constitute a limitation on the units in a case.

According to another aspect, this application further provides a non-transitory computer-readable storage medium.

The computer-readable storage medium may be included in the electronic device described in the foregoing embodiments, or may exist alone and is not assembled in the electronic device. The computer-readable storage medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. Actually, according to the implementations of this application, the features and functions of two or more modules or units described above may be specified in one module or unit. Conversely, the features and functions of one module or unit described above may be further divided into a plurality of modules or units to be embodied.

Through the description of the foregoing embodiments, a person skilled in the art can easily understand that the exemplary implementations described herein may be implemented by software, or may be implemented by combining software with necessary hardware. Therefore, the technical solutions of the embodiments of this application may be implemented in a form of a software product. The software product may be stored in a non-volatile storage medium (which may be a CD-ROM, a USB flash drive, a removable hard disk, or the like) or on a network, including several instructions for instructing a computing device (which may be a PC, a server, a touch terminal, a network device, or the like) to perform the methods according to the embodiments of this application.

After considering the specification and practicing the implementations of this application, a person skilled in the art may easily conceive of other implementations of this application. This application is intended to cover any variation, use, or adaptive change of this application. These variations, uses, or adaptive changes follow the general principles of this application and include common general knowledge or common technical means in the art that are not disclosed in this application.

This application is not limited to the precise structures described above and shown in the accompanying drawings, and various modifications and changes can be made without departing from the scope of this application. The scope of this application is subject only to the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs location determination and/or obstacle determination. In practical application, the foregoing functions may be allocated to and completed by different functional modules according to requirements, that is, an inner structure of a device is divided into different functional modules to implement all or a part of the functions described above.

What is claimed is:

1. A driving assistance processing method, performed by an electronic device, the method comprising:
    obtaining location information and traveling status information of a vehicle terminal and road condition information of a road section on which the vehicle terminal travels, and obtaining blind spot detection capability information of the vehicle terminal;
    determining a potential blind spot of the vehicle terminal in a traveling process according to the location information and the traveling status information of the vehicle terminal and the road condition information to obtain a blind spot detection result;
    generating a blind spot supplementary reminder message according to the blind spot detection result and the blind spot detection capability information of the vehicle terminal; and
    sending the blind spot supplementary reminder message to the vehicle terminal.

2. The driving assistance processing method according to claim 1, wherein determining the potential blind spot of the vehicle terminal comprises:
    determining that a visual obstacle exists at a location of the vehicle terminal according to the location information and the traveling status information of the vehicle terminal and the road condition information; and
    in response to determining that a visual obstacle exists at the location of the vehicle terminal, generating the potential blind spot of the vehicle terminal based on the location at which the visual obstacle exists.

3. The driving assistance processing method according to claim 2, further comprising determining that the visual obstacle exists at the location of the vehicle terminal according to one or more of:
    the location of the vehicle terminal corresponds to a bend area;
    the vehicle terminal is in a tunnel;
    the vehicle terminal is in an uphill state; and
    an obstacle blockage exists at a nearby location of the vehicle terminal.

4. The driving assistance processing method according to claim 1, wherein obtaining the blind spot detection capability information of the vehicle terminal comprises:
    obtaining advanced driving assistance system (ADAS) capability information sent by the vehicle terminal, the ADAS capability information comprising identifier information of the vehicle terminal and at least one piece of the following information of the vehicle terminal: information about support for a plurality of ADAS functions of the vehicle terminal and information about a sensor equipped on the vehicle terminal; and
    determining the blind spot detection capability information of the vehicle terminal according to the ADAS capability information.

5. The driving assistance processing method according to claim 1, wherein obtaining the blind spot detection capability information of the vehicle terminal comprises:
obtaining a blind spot detection history record reported by the vehicle terminal; and
determining the blind spot detection capability information of the vehicle terminal according to the blind spot detection history record.

6. The driving assistance processing method according to claim 1, wherein obtaining the blind spot detection capability information of the vehicle terminal comprises:
obtaining a blind spot detection history record reported by the vehicle terminal and feedback information of a driver of the vehicle terminal to blind spot warning; and
determining the blind spot detection capability information of the vehicle terminal according to the blind spot detection history record and the feedback information of the driver to blind spot warning.

7. The driving assistance processing method according to claim 1, further comprising:
synchronizing time with the vehicle terminal to allow the vehicle terminal to process the blind spot supplementary reminder message based on the synchronized time.

8. The driving assistance processing method according to claim 7, wherein the synchronizing time with the vehicle terminal comprises one or more of:
adding explicit timestamp information to the blind spot supplementary reminder message to synchronize the time with the vehicle terminal; and
synchronizing the time with the vehicle terminal in an implicit indication mode, the implicit indication mode comprising implicitly indicating, based on explicit timestamp information of some data packets in data packets transmitted through the same transmission channel, timestamp information of other data packets.

9. The driving assistance processing method according to claim 1, further comprising:
when it is difficult to determine a potential blind spot of the vehicle terminal in the traveling process according to the location information and the traveling status information of the vehicle terminal and the road condition information, sending a blind spot reminder message to all vehicle terminals on the road section on which the vehicle terminal travels.

10. The driving assistance processing method according to claim 1, further comprising:
predicting, according to the location information and the traveling status information of the vehicle terminal and the road condition information of the road section on which the vehicle terminal travels, that a network status of an area that the vehicle terminal is about to enter is inadequate to support blind spot warning; and
in response to the predicting, sending warning information to the vehicle terminal before the vehicle terminal enters the area,
wherein the warning information comprises at least one of the following: information about a potential blind spot in the area, and information prompting that blind spot warning cannot be provided in the area.

11. The driving assistance processing method according to claim 10, further comprising:
when the area is not within a network coverage area or network quality in the area is less than a set value, determining that the network status of the area is inadequate to support blind spot warning.

12. The driving assistance processing method according to claim 1, further comprising:
before generating the blind spot supplementary reminder message:
determining, according to the blind spot detection result and the blind spot detection capability information of the vehicle terminal, whether it is necessary to send the blind spot supplementary reminder message to the vehicle terminal; and
generating the blind spot supplementary reminder message in response to determining, according to the blind spot detection result and the blind spot detection capability information of the vehicle terminal, that it is necessary to send the blind spot supplementary reminder message to the vehicle terminal.

13. An electronic device, comprising:
one or more processors; and
memory storing one or more programs, the one or more programs comprising instructions that, when executed by the one or more processors, cause the one or more processors to perform operations comprising:
obtaining location information and traveling status information of a vehicle terminal and road condition information of a road section on which the vehicle terminal travels, and obtaining blind spot detection capability information of the vehicle terminal;
determining a potential blind spot of the vehicle terminal in a traveling process according to the location information and the traveling status information of the vehicle terminal and the road condition information to obtain a blind spot detection result;
generating a blind spot supplementary reminder message according to the blind spot detection result and the blind spot detection capability information of the vehicle terminal; and
sending the blind spot supplementary reminder message to the vehicle terminal.

14. The electronic device according to claim 13, wherein determining the potential blind spot of the vehicle terminal comprises:
determining that a visual obstacle exists at a location of the vehicle terminal according to the location information and the traveling status information of the vehicle terminal and the road condition information; and
in response to determining that a visual obstacle exists at the location of the vehicle terminal, generating the potential blind spot of the vehicle terminal based on the location at which the visual obstacle exists.

15. The electronic device according to claim 14, further comprising determining that the visual obstacle exists at the location of the vehicle terminal according to one or more of:
the location of the vehicle terminal corresponds to a bend area;
the vehicle terminal is in a tunnel;
the vehicle terminal is in an uphill state; and
an obstacle blockage exists at a nearby location of the vehicle terminal.

16. The electronic device according to claim 13, wherein obtaining the blind spot detection capability information of the vehicle terminal comprises:
obtaining advanced driving assistance system (ADAS) capability information sent by the vehicle terminal, the ADAS capability information comprising identifier information of the vehicle terminal and at least one piece of the following information of the vehicle terminal: information about support for a plurality of ADAS functions of the vehicle terminal and information about a sensor equipped on the vehicle terminal; and determining the blind spot detection capability information of the vehicle terminal according to the ADAS capability information.

17. The electronic device according to claim 13, wherein obtaining the blind spot detection capability information of the vehicle terminal comprises:
   obtaining a blind spot detection history record reported by the vehicle terminal; and
   determining the blind spot detection capability information of the vehicle terminal according to the blind spot detection history record.

18. A non-transitory computer-readable storage medium, storing one or more instructions, the one or more instructions, when executed by one or more processors of an electronic device, cause the electronic device to perform operations comprising:
   obtaining location information and traveling status information of a vehicle terminal and road condition information of a road section on which the vehicle terminal travels, and obtaining blind spot detection capability information of the vehicle terminal;
   determining a potential blind spot of the vehicle terminal in a traveling process according to the location information and the traveling status information of the vehicle terminal and the road condition information to obtain a blind spot detection result;
   generating a blind spot supplementary reminder message according to the blind spot detection result and the blind spot detection capability information of the vehicle terminal; and
   sending the blind spot supplementary reminder message to the vehicle terminal.

19. The non-transitory computer-readable storage medium according to claim 18, wherein obtaining the blind spot detection capability information of the vehicle terminal comprises:
   obtaining a blind spot detection history record reported by the vehicle terminal and feedback information of a driver of the vehicle terminal to blind spot warning; and
   determining the blind spot detection capability information of the vehicle terminal according to the blind spot detection history record and the feedback information of the driver to blind spot warning.

20. The non-transitory computer-readable storage medium according to claim 18, the operations further comprising:
   synchronizing time with the vehicle terminal to allow the vehicle terminal to process the blind spot supplementary reminder message based on the synchronized time.

\* \* \* \* \*